Oct. 3, 1967

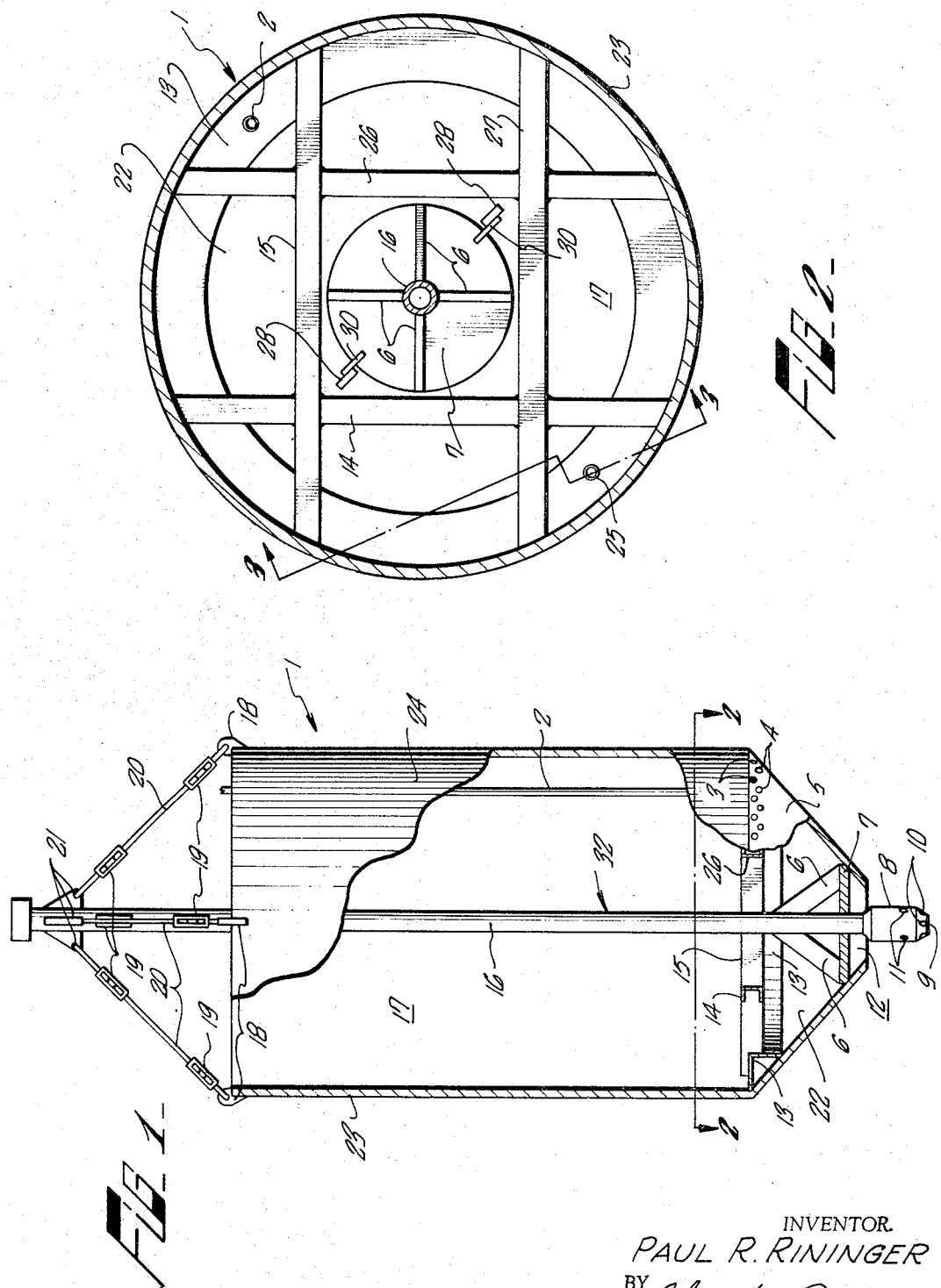

P. R. RININGER 3,344,612

SHALLOW WATER CAISSON

Filed Feb. 17, 1966

INVENTOR.
PAUL R. RININGER
BY
Christie, Parker & Hale
ATTORNEYS.

United States Patent Office 3,344,612
Patented Oct. 3, 1967

3,344,612
SHALLOW WATER CAISSON
Paul R. Rininger, Woodland Hills, Calif., assignor to Global Marine Inc., Los Angeles, Calif., a corporation of California
Filed Feb. 17, 1966, Ser. No. 528,263
6 Claims. (Cl. 61—63)

This invention relates to the art of well drilling in shallow waters having a bottom of loosely compacted material. More particularly, this invention relates to a caisson for use in such drilling, as well as for housing elements of a producing well after drilling is completed.

Large oil deposits often occur in areas of the ocean or other waters which are relatively shallow. Often times the floor or bottom of such waters is formed of fluid-displaceable material such as ooze, mud, or loosely compacted soil. This material can be many feet thick. When drilling in these waters, a drilling vessel may be employed from which a drill pipe extends to the bottom for the drilling of a well. Because of water disturbances, such as wave actions and currents, the vessel has a tendency to move in relation to the drill pipe, causing the latter to be subjected to stress. In addition, such waters may be so shallow that clearance between the drilling vessel and the drilling apparatus located on the floor becomes a critical problem. Moreover, after a well is completed and in production, such production adjuncts as well "Christmas trees," blowout preventers, and the like, present navigational and fishing hazards. Because of these hazards, governmental regulations often require the positioning of these production appendages below the bottom of the water.

This invention provides a caisson, for use in shallow water having a floor of fluid-displaceable materials, which overcomes the above and associated problems. This caisson has a hollow housing or shell secured to a tapered base. Along a line proximate to the upper peripheral surface of the base is disposed means for discharging fluid under pressure in both a horizontal and vertical direction. The fluid is for agitating and displacing floor material and for keeping such material from sticking to the sides of the caisson. The means is preferably in the form of a plurality of apertures extending from the interior to the exterior of the base, together with a fluid manifold within the base disposed in fluid communication with the apertures. The tapered base also has an opening at the apex below which a jetting nozzle is normally located. The nozzle has a plurality of fluid ports opening to its outside. The jetting nozzle forms a part of a jetting nozzle assembly which is removable from the caisson and generally comprises the jetting nozzle, disposed below the opening, means for preventing ocean bottom material from entering the caisson through the opening, and means for providing fluid under pressure to the nozzle. The entire caisson is designed to rotate about its vertical axis as it displaces bottom material in order to prevent channeling of the fluid used in displacing such material through zones of little resistance. After the caisson is in its final position, the jetting nozzle assembly is removed and the opening then serves for the passage of well drilling equipment such as a Kelly joint, conductor pipe, or casing.

The advantages of the present invention are derived from the fact that the shallow water caisson has the capability of artificially lowering a bottom composed of ooze, mud, or loosely compacted soil. This lowering is accomplished through the displacement of the bottom's composition by fluid under pressure and the weight of the caisson. In its final position the interior of the caisson defines a space which becomes, in effect, a lowered bottom. The interior of the caisson provides additional length for drill pipes, affording line flexibility, which, in turn, tends to overcome the problem of water disturbances. Moreover, the lowered bottom allows the placement of drilling apparatus below the normal water bottom which often assures adequate clearance between such apparatus and the drilling vessel. In addition, after a well is completed and in production, the interior of the caisson provides space for the storing of production apparatus below the normal water's floor, thus avoiding navigational and fishing hazards.

These and other features, aspects and advantages of the present invention will become more apparent from the following description, appended claims, and drawings, in which:

FIGURE 1 is an elevational view, partly in half section of a preferred embodiment of this invention;

FIGURE 2 is a plan view, partly in section, taken along line 2—2 of FIGURE 1;

Figure 3:
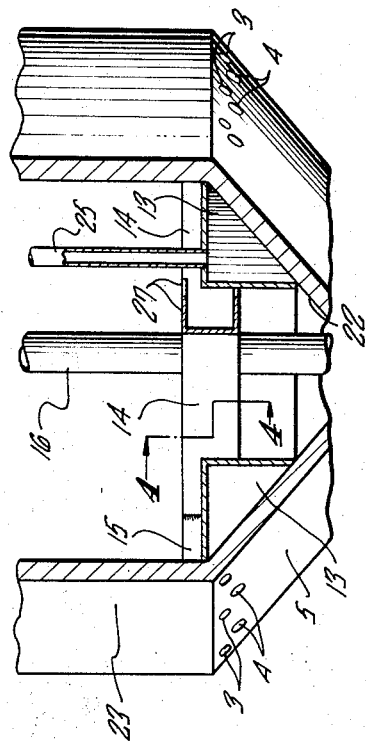
FIGURE 3 is a view, partly in section, taken along line 3—3 of FIGURE 2.

Referring now to the figures, there is seen the caisson shown by reference numeral 1. This caisson has hollow housing or shell 24 which is connected, preferably by welding, at its lower end to a hollow tapered bottom or base 5. The tapered quality allows the caisson to more easily penetrate through the bottom material. This taper is preferably provided by forming the base 5 into a hollow frusto-conical cone with an opening 12 at its apex. Fluid manifold 13 is annularly disposed around the upper inner surface 22 of the base 5 in fluid communication with apertures 3 and 4 which are also disposed around the upper inner surface of the bottom 5. The fluid manifold may conveniently be fabricated from a metal angle and welded in place along its edges to the inner surface 22. The apertures are, of course, in fluid communication with the outside of the caisson and are disposed to impart a vertical as well as a radial component to a fluid. These components overcome any eddying of bottom material-fluid mixtures in the vicinity of the outer periphery of the base as well as eliminating the possibility that bottom material might stick to the sides of the caisson. In this connection, for long caissons, additional fluid distribution manifolds positioned along the length of the shell 24 will eliminate the tendency of bottom material sticking to its surface. The vertical and radial components of fluid velocity are conveniently accomplished by providing lateral fluid apertures 3 interposed between vertical fluid apertures 4. Beams 14, 15, 26 and 27 are secured at their ends to the lower inner surface of the shell 24 and the inner surface 22 of base 5 by attachment to the fluid manifold 13. These beams serve to reinforce the connection between housing 24 and base 5, provide structural rigidity, and serve as supports for machinery and men within the caisson.

The lower portion of the jetting nozzle assembly 32 comprises a plug 7, jetting nozzle 8, and a plurality of supports 6, as well as part of the supply pipe 16. The supports 6 are secured, preferably by welding, to the upper surface of the plug 7 and pipe 16. The plug rests on the inner surface 22 of the base 5, and determines the position below the opening 12 of the jetting nozzle 8. The jetting nozzle 8 has a series of ports for the distribution of fluid under pressure into the fluid displaceable material of the water's bottom. These ports include radial ports 11, lateral ports 10, and center port 9.

The interior or space 17 of the caisson 1 is bounded by a cylindrical wall 23. Within interior 17 are the means for supplying fluid under pressure to the manifold 13, such as pipes 2 and 25. On the upper portion of the cylindrical wall 23 is secured a plurality of housing pad eyes 18, preferably four in number and disposed at 90 degree intervals. These pad eyes serve as part of a sling and positioning assembly for the jetting nozzle assembly 32. The sling assembly, additionally, has four upper pad eyes 21, secured to the pipe 16. Between each of the upper pad eyes 21 and the corresponding housing pad eyes 18, are individual slings 20. These slings are preferably wire cable secured in place by turn buckles 19. The sling assembly serves to axially position the jetting nozzle assembly 32 in the housing 24, and to provide an additional force acting along pipe 16 through supports 6 to the interface between the plug 7 and the inner wall 22 of the base 5 to seal the caisson's interior.

The disposition of the various components of the caisson 1 within its interior 17 is better seen with reference to FIGURE 2. As was previously indicated, the beams 14, 15, 26 and 27 provide structural support for the wall 23 of the shell 24 and the upper portion of the base 5, as well as support for men and machinery in the caisson. For convenience of fabrication, these beams are preferably channels. Fluid supply manifold 13 is seen annularly disposed around the upper portion of the inner surface 22 of the base 5. Pipes 2 and 25, disposed at 180 degrees from each other, supply fluid under pressure to the manifold 13. In order to achieve good fluid distribution in the manifold 13, more than one pipe is employed. The plug 7 is secured against rotation with respect to the base by members 30 acting against stops 28. The disposition of each of the supports 6, between plug 7 and jetting nozzle supply pipe 16, is seen to be at about 90 degrees to each other. However, other dispositions are possible.

The relationship between manifold 13 and the inner wall 22 of the base 5 and the lower portion of wall 23 of housing 24, is better seen by reference to FIGURE 3. Lateral apertures 3 are disposed within base 5 in fluid communication with the manifold 13 and the outside of the caisson. These lateral apertures have an axis at least approximately radial to the longitudinal axis of the caisson in order to spray fluid radially of the caisson. Vertical apertures 4, similarly disposed around the upper periphery of the base 5, are also in fluid communication with manifold 13. The axis of each of the vertical apertures is disposed such that fluid will be discharged in a direction at least substantially parallel to the longitudinal axis of the caisson. By having both radial and vertical components for the fluid being discharged from manifold 13, a high rate of agitation and displacement of the composition of the water bottom is achieved and the tendency of such material to stick to the outside of the caisson is overcome. Moreover, these components tend to eliminate the channeling of fluid being discharged into areas of low resistance. Channeling, in many instances, severely affects the settlement of the caisson into the bottom material. Fluid supply means 25 is in communication with the interior of the manifold 13 as shown. Beam 27 as well as the other beams are preferably mounted by welding a portion of their ends to the housing wall 23 and the wall of the manifold 13.

Figure 4:
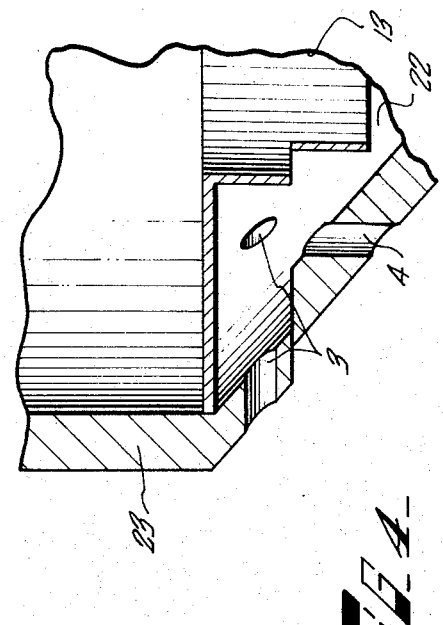
FIGURE 4 is a view, partly in section, taken along line 4—4 of FIGURE 3.

FIGURE 4 shows the alternate vertical and radial disposition for the apertures 3 and 4. As is therein shown, apertures 3 extend radially through the wall of base 5 providing fluid communication between the interior of the manifold 13 and the environment outside of the caisson. Similarly, aperture 4 is vertically disposed in the wall of the base 5 in fluid communication with the interior of the manifold 13 and the outside of the housing.

Figure 5:
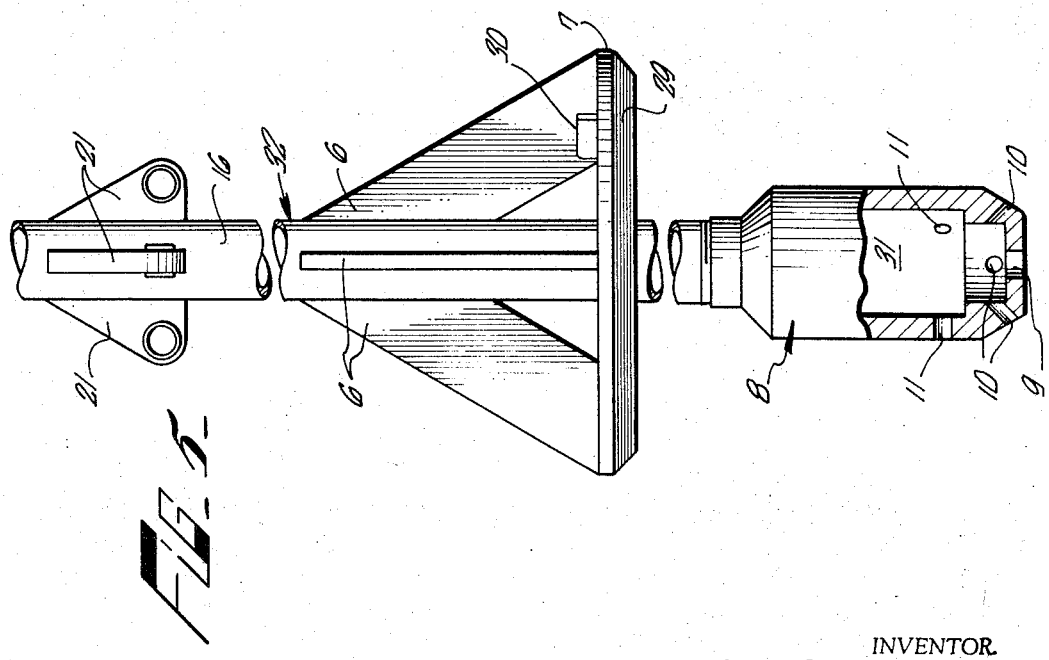
FIGURE 5 is an elevational view, partly in section, of a preferred jetting nozzle assembly of the present invention.

With reference to FIGURE 5, there is shown the removable jetting nozzle assembly 32 of this invention. The jetting nozzle 8 comprises an enclosure having a cavity 31 in fluid communication with the interior of the jetting nozzle supply pipe 16. Radial ports 11, preferably three in number, and disposed at 120 degrees each from the other, provide a radial component for fluid discharge from the jetting nozzle. Lateral ports 10, preferably four in number, and disposed at 90 degrees from each other, provide a downwardly and outwardly fluid component. Center port 9 provides another vertical component for fluid being discharged from cavity 31. The plug 7 has a bevelled seat 29 which conforms to the tapered inner surface 22 of the base 5 to provide an effective barrier against mud, ooze, and other bottom materials from entering the housing through the opening 12 in the base 5. Members 30 contact stops 28 and provide the means by which the jetting nozzle assembly 32 and the remainder of the caisson 1 can rotate as a unit. Supports 6, which are preferably welded at their ends to the jetting supply pipe 16 and the upper surface of the plug 7, provide rigidity for the assembly, and assure the proper positioning of the plug 7 with relation to the jetting nozzle supply pipe 16. At the upper end of the jetting nozzle assembly 32 are secured the four upper pad eyes 21 which are the upper anchoring termini for the sling previously described.

In operation, the caisson 1 with the jetting nozzle assembly 32 in place is disposed on the floor of a body of water in its proper horizontal location. Fluid under pressure is supplied to jetting nozzle 8 through jetting nozzle supply pipe 16, and to manifold 13 through manifold supply pipes 2 and 25. The fluid supplied to manifold 13 escapes through the lateral apertures 3 and the vertical apertures 4. The combined vertical and lateral components of the fluid escaping from these apertures agitates and displaces the bottom composition forcing it outwardly of the caisson. The jetting nozzle 8 through its plurality of ports 10, 11 and 12 similarly agitates the bottom material. The radial ports 11 force this material outwardly of the jetting nozzle 8; the lateral ports 10 force the bottom material downwardly and outwardly from the jetting nozzle 8; and the center port 9 displaces the bottom material immediately below the nozzle 8. The tapered shape of the base 5 allows the caisson, by its weight, to easily occupy the developing space being created by the action of the fluid under pressure and forces bottom material outwardly of the caisson. In order to avoid channeling of the fluid through pockets of low resistance, the caisson may be rotated about its axis as it displaces bottom material. When the appropriate depth has been achieved, fluid flow through jetting nozzle supply pipe 16 and manifold supply pipes 2 and 25 is terminated. The slings 20 are removed from the housing 24 and the jetting nozzle assembly 32. The assembly is then removed.

After removal of the jetting nozzle assembly 32, well drilling is commenced typically by placing a drill pipe or Kelly joint into and through the shell 24 and the opening 12 in the base 5. The interior or space 17 of the housing 24 then provides working space for divers, which may be required in the drilling operation, as well as a convenient housing for portions of the drilling equipment. After the drilling operation is completed, the space 17 of the shell or housing 24 serves as a space for well producing equipment such as blow-out preventives, "Christmas trees," etc. In mounting such equipment, as well as providing convenient support for divers, the beams 14, 15, 26 and 27 supply a ready framework.

The concepts of this invention are applicable to many forms and shapes of the caisson 1. However, cylindrical housing 24 is preferred because it provides the minimum cross-sectional area presented to the bottom for a given area within its interior 17. Moreover, it is easily fabricated in the cylindrical shape. Similarly, the base 5 may take several shapes, but the preferred shape is the inverted frusto-conical cone illustrated. This shape is readily fabricated, has good structural characteristics, and, of course, lends itself to easy attachment to the lower portion of the housing wall 23. The opening 12 in the bottom 5 is oversized to accommodate relatively large drilling equipment such as Kelly joints. This requirement is one of the reasons for plug 7 which, as previously described, prevents the bottom material from entering the caisson. The beams 14, 15, 26 and 27 are not necessary for satisfactory operation of the instant caisson, but do provide structural support as well as a convenient framework for divers and well-producing equipment. The upper portion of the housing 24 may be adapted to receive an expanded metal sheet for the convenience of personnel working on such items as the sling assembly. It has been found that there is no necessity for enclosing the upper end of the housing 24 for there is little bottom material backwash into the interior of the caisson through this opening. Hence, it is left open. Preferred practice dictates the use of water as the fluid supply to the manifold 13 of the jetting nozzle 8 because its inertia readily displaces material.

This invention has been described with reference to a preferred embodiment. It should be readily appreciated that concepts of this invention extend beyond this embodiment and that, therefore, the appended claims should not be limited thereto.

What is claimed is:

1. A shallow water caisson capable of providing space below the floor of a body of water when such floor is composed of fluid displaceable material, such space being suitable for well fabricating and producing equipment, said shallow water caisson comprising:
    (a) a shell having an interior defining the space;
    (b) a hollow tapered base fluid tightly joined at its largest end to the bottom of said shell with its taper extending downwardly and inwardly from said shell and having an opening at its apex of sufficient diameter to pass well drilling equipment;
    (c) means for discharging fluid under pressure to the exterior of said caisson around its outer periphery proximate to the junction of said shell and said base with both a vertical and horizontal component of velocity; and
    (d) a removable jetting nozzle assembly comprising: a jetting nozzle disposed below and coaxial with the opening having a plurality of fluid ports in fluid communication with the exterior of the nozzle, such ports being disposed to provide both a vertical and horizontal component of fluid velocity, means for providing fluid under pressure to the fluid ports, and means for preventing the material from the floor from entering the interior of said shell through the opening.

2. The shallow water caisson claimed in claim 1 wherein said shell is cylindrical and said base comprises an inverted and hollow frusto-conical cone.

3. The shallow water caisson claimed in claim 2 wherein said means for discharging fluid under pressure to the exterior of said caisson includes:
    (a) a plurality of apertures disposed to provide the vertical and horizontal components of velocity, the apertures being disposed around the upper portion of said base in fluid communication with its exterior;
    (b) a fluid manifold disposed within the base in fluid communication with the plurality of apertures; and
    (c) means for introducing fluid under pressure to said fluid manifold.

4. The shallow water caisson claimed in claim 3 wherein said means in said jetting nozzle assembly for preventing the material from the floor from entering the interior of said shell comprises a plug having at least a portion of its periphery in contact with the inner surface of said base to form a seal.

5. The shallow water caisson claimed in claim 4 wherein said means for providing fluid under pressure to the fluid ports of said jetting nozzle includes a jetting nozzle supply pipe carrying said jetting nozzle and secured to said plug, said pipe extending upwardly through the opening in the base, through said plug, and into the interior of said shell.

6. The shallow water caisson claimed in claim 5 wherein said jetting nozzle supply pipe extends above said shell and including:
    (a) means for preventing rotation of said jetting nozzle assembly with respect to said base and shell; and
    (b) a removable sling attached to the jetting nozzle supply pipe above said shell and to said shell to support and center said pipe.

References Cited

UNITED STATES PATENTS 3,202,218   8/1965   Watts et al. _____ 166—.5

DAVID J. WILLIAMOWSKY, *Primary Examiner.*

J. SHAPIRO, *Examiner.*